June 18, 1929.　　H. C. BAUSINGER, JR., ET AL　　1,717,649
SELVAGE CUTTING MECHANISM FOR LOOMS
Filed May 11, 1927　　　3 Sheets-Sheet 1
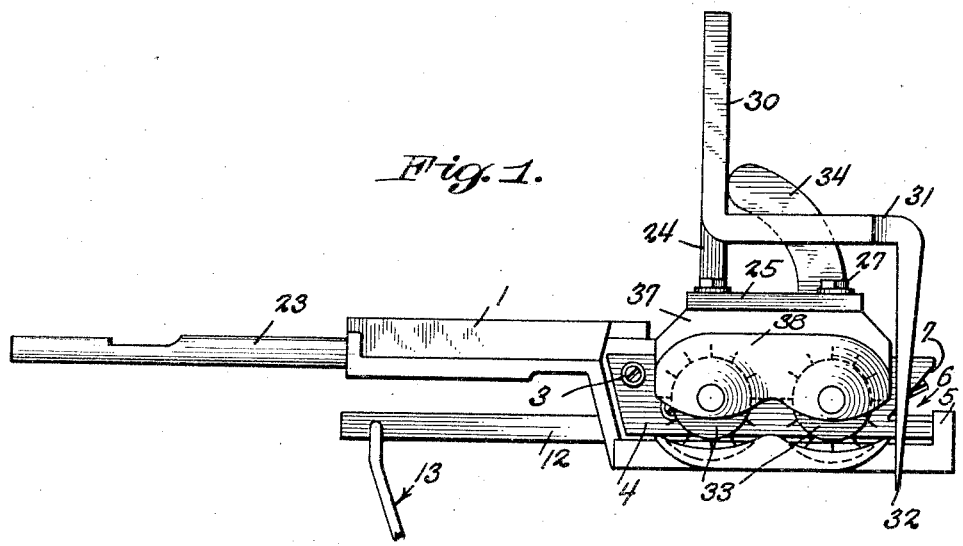
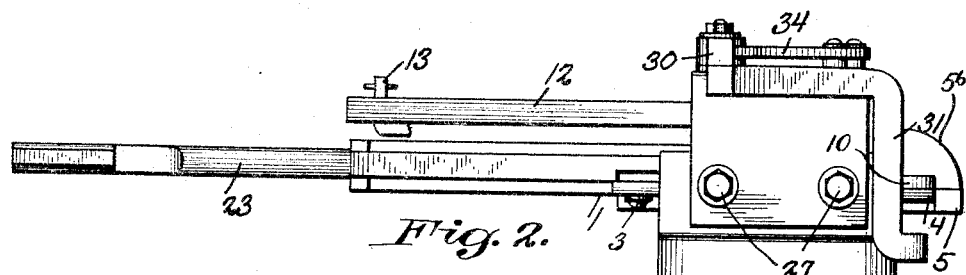
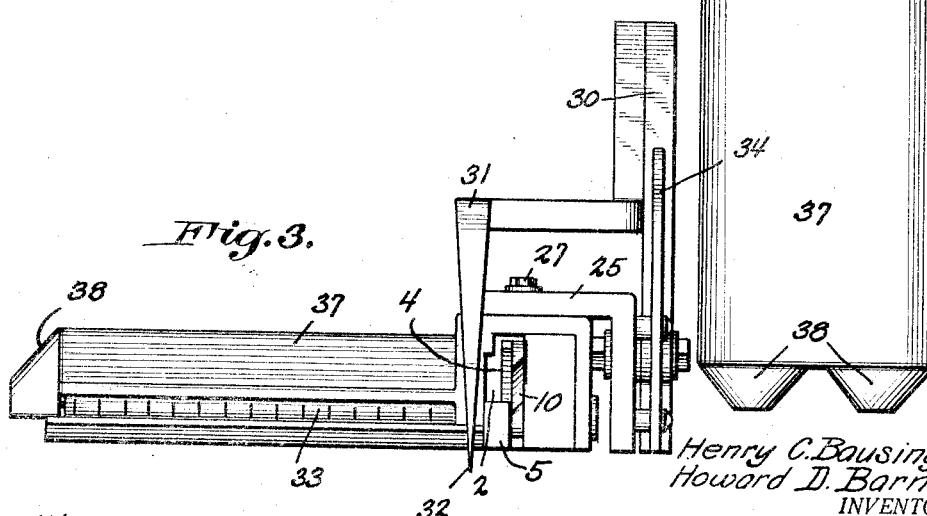
Henry C. Bausinger
Howard D. Barnes
INVENTOR.
BY Richard B. Owen
ATTORNEYS.
Witnesses June 18, 1929. H. C. BAUSINGER, JR., ET AL 1,717,649
SELVAGE CUTTING MECHANISM FOR LOOMS
Filed May 11, 1927 3 Sheets-Sheet 2

Witnesses
C. E. Churchman
Wm. P. Smith

Henry C. Bausinger
Howard D. Barnes
INVENTOR.

BY Richard B. Owen
ATTORNEYS.

June 18, 1929.  H. C. BAUSINGER, JR., ET AL  1,717,649
SELVAGE CUTTING MECHANISM FOR LOOMS
Filed May 11, 1927   3 Sheets-Sheet 3

Henry C. Bausinger
Howard D. Barnes
INVENTOR.

Witnesses
C. E. Churchman
Wm. R. Smith

BY Richard B. Owen
ATTORNEYS.

Patented June 18, 1929.

1,717,649

UNITED STATES PATENT OFFICE.

HENRY C. BAUSINGER, JR., AND HOWARD D. BARNES, OF BUCYRUS, OHIO.

SELVAGE-CUTTING MECHANISM FOR LOOMS.

Original application filed March 1, 1926. Serial No. 91,626. Divided and this application filed May 11, 1927. Serial No. 190,622.

This invention relates to a loom temple structure, and has for its primary object the construction of a device that will do away with the usual wastage and uncertainty of cutting operations which is characteristic of cutters and temple structures now on the market.

Another object of the invention is the design of a cutting device that may be arranged upon the frame of the loom contiguous to the edge of the selvage so as to perform a clean cut at the selvage to save material and further prevent the looping back of the filling into the selvage.

A further object of the invention is the design of a temple and cutting device in a unitary structure adjustable in a plurality of directions so as to be properly associated with the selvage of the web and further cooperating with movable parts of the loom in a manner to be operated only at each change of shuttle, thereby greatly prolonging the life of the device as a whole and eliminating the constant sharpening of the cutting knife.

A feature of our invention is the novel substantial manner of designing and associating the various parts so that positive relative action is assured between the parts to provide a uniform width of web, the cutting of the thread flush with the selvage, and the elimination of the accumulation of foreign matter, such as lint and oil, upon the parts.

Besides the above, our invention is distinguished in the novel manner in which the device operates upon the web so that light and heavy work can be accommodated without in any manner sacrificing the efficiency of the device.

With these and other objects in view, our invention will be better understood from a description of the same when taken in connection with the accompanying drawings, wherein:—

Figure 1 is an end elevation of our combination temple structure;

Figure 2 is a top plan view;

Figure 3 is a side elevation;

Figure 4:
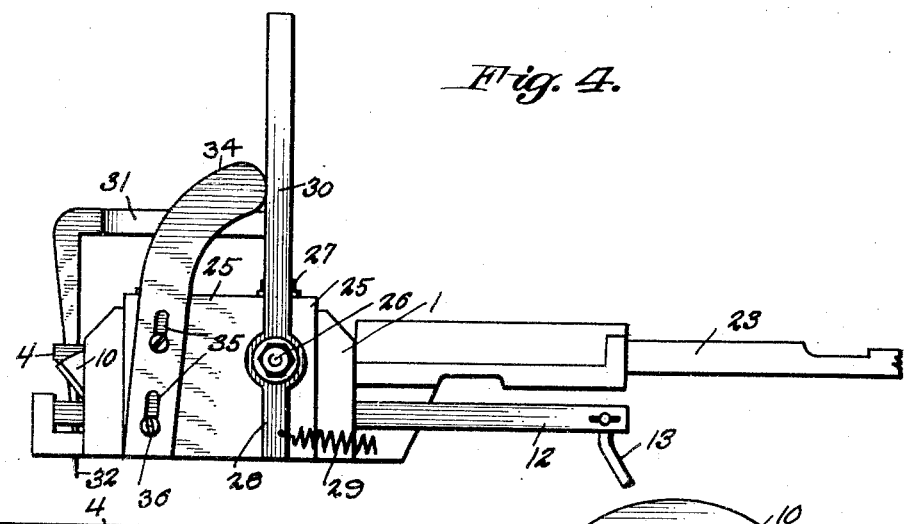
Figure 4 is an end elevation opposite to Figure 1.
Figure 5:
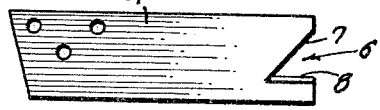
Figures 5 and 6 are plan views of the type of knives used with the construction illustrated.
Figure 6:
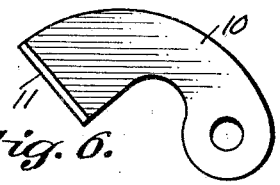

Again referring to the drawings illustrating one of the many constructions of our invention, the numeral 1 designates the loom temple having a recess 2 in which is removably mounted by means of the screws 3 a stationary knife 4. This stationary knife 4 has abutting engagement with an abutment 5, a component part of the support, so as to properly position the notch 6 that has one wall 7 arranged at an incline to the horizontally extending cutting edge 8. The abutment 5 has a rearwardly curved wall $5^b$ engageable with the cut thread to direct the same away from the knives. Swingingly carried by the stub shaft 9 mounted on the body is a movable knife 10, the cutting edge 11 of which swings across the notch 6, so as to coact with the edge 8 to assure a positive and clean cut of the weft thread when the latter is positioned in the notch in the novel manner hereinafter described. This stub shaft 9 has connected thereto an operating crank arm 12 operated in any suitable manner by a link 13 which is connected with a moving part of the shuttle changing mechanism of the loom and constitutes a part of a mechanism more clearly set forth and claimed in our co-pending application, filed March 1, 1926, Serial #91,626, the present application being a division of that application.

As one of the most important features of our invention is the placing of the knives contiguous to or flush with the selvage of the web, we provide a novel connection between the body and the frame of the loom so that the body may be adjusted in a plurality of directions to properly position the cutting edges of the knives relative to the selvage. To accomplish this desired result, we mount upon the frame 14 of the loom a guide plate 15 having a guide slot 16 adjustably associated with the clamp bolts 17 carried by the slide 18 that in turn is adjustably associated with the socket plate 19 by the clamp screws 20 mounted in the slot 21 in the socket plate. The socket 22 of the socket plate removably receives the shank 23 that projects laterally from the support 1.

As far as we have proceeded, it will be appreciated that the cutting edges of the companion knives may be brought in close proximity to the selvage of the web so that the thread may be cut practically flush with the selvage, thereby saving material and assuring a clean cut and the elimination of a subsequent cut of the selvage after the web leaves the loom. This is brought about by adjustably connecting the support to the loom, as illustrated, and providing one of the knives with a notch so disposed as to readily receive therein a thread and direct the same into engagement with the horizontal cutting edge 8 to be properly cut in the swinging movement of the cutting edge 11 across the notch.

Our novel construction of selvage fork which constitutes the subject matter of our copending application filed May 11, 1927, Serial No. 190,623, comprises a lever 24 pivotally secured to a plate 25, as illustrated at 26, the plate being detachably bolted to the support 1, as illustrated at 27. As the lever is pivoted at an intermediate point to the plate, we provide a short arm 28 and a spring 29 for constantly urging the long arm 30 in the direction of the cutting edges of the knives. The long arm 30 has secured thereto a second arm 31 having a pointed extremity 32 which is adapted to engage the first mesh at the selvage on movement of the lay beam to rear center position, and thus prevent narrowing-in of the web.

To limit the swinging movement of the selvage fork and thereby control the operative position of the extremity 32, we provide an adjustable stop 34 adjustably associated with the plate 25 so as to vary its position relative to the selvage fork. One manner of accommodating the adjustable movements of the stops is by providing the latter with slots 35 associated with screws 36 that are mounted in the plate 25. To complete the invention, we provide the temple support 1 with a knife abutment 5 so arranged that when a thread is cut the end remaining on the bobbin cannot be drawn or looped back into the web. This abutment 5 also protects the rigid knife 4 and is a support for the thread while being cut and will cause the severed end remaining in the bobbin to drop down and out of the way. This is important, as the quickly severed thread has a tendency to coil or flop and be caught in web when next shed is made. These actions are made without the utilization of an extra element or an extra device to perform these functions.

Figure 7:
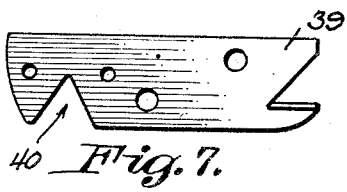
Figures 7 and 8 are elevations of a special design of knives.
Figure 8:
Figure 9:
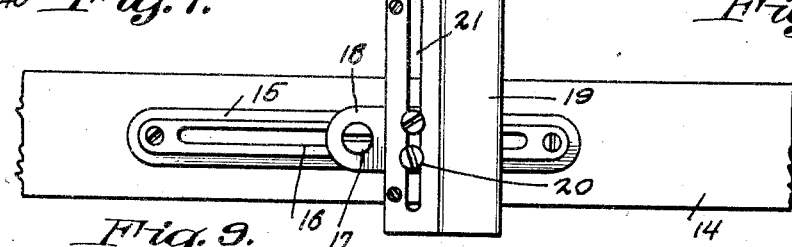
Figure 9 is a top plan view of the socket plate and associate parts.
Figure 10:
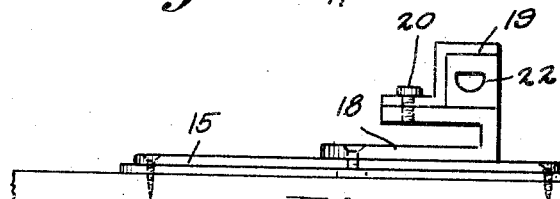
Figure 10 is an end elevation of the socket plate and associate parts.
Figure 11:
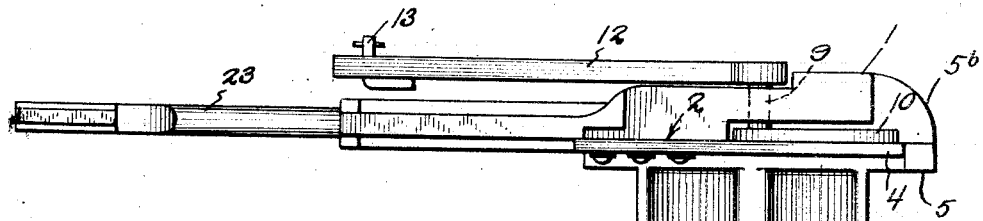
Figure 11 is a top plan view of the temple support and associate parts.
Figure 14:
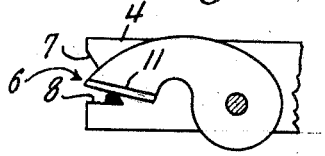
Figure 14 is an enlarged diagrammatic view illustrating a thread in position ready for the cutting operation.
Figure 12:
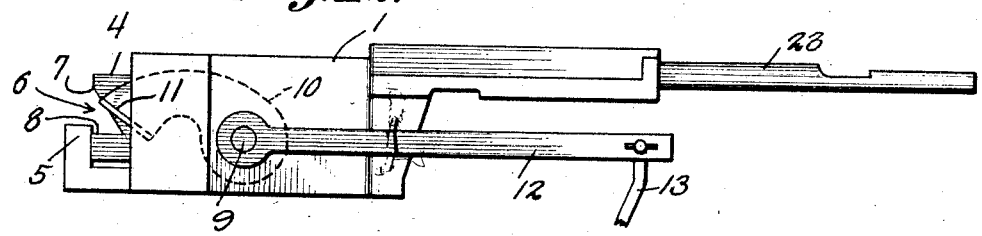
Figure 12 is an end elevation of the structure shown in Figure 11.
Figure 13:
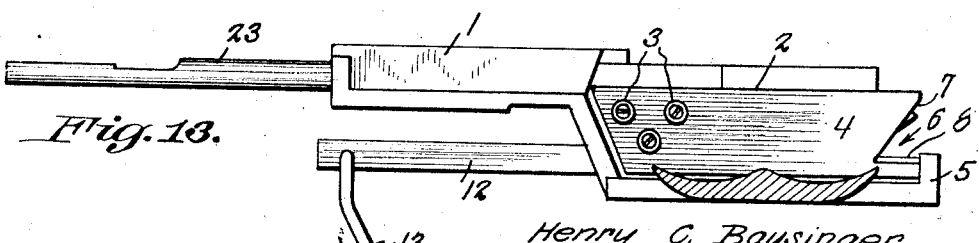
Figure 13 is a cross sectional view of the supporting structure.

In Figures 7 and 8, we have shown a slight change in the construction of the knives to allow the knives to be associated with structures now on the market, and to accomplish this desired result the stationary knife 39 is provided with a recess 40 and a movable knife 41 of a more abrupt curved formation at the point 42 to accommodate itself to the curvature of devices now on the market.

From the foregoing description taken in connection with the accompanying drawings, it will be appreciated that we have provided a combination temple and selvage device that are connected together in a unitary article for ready adaptability to various types of looms now on the market and in such a manner that the device may be positioned practically flush with the selvage of the web so as to perform a flush, clean-cut operation, while at the same time positively preventing the web from narrowing. It will also be appreciated that the various parts are of a substantial design and substantially associated with each other so as to provide a device rigid throughout, and relatively few movable parts which are practically kept clean at all times due to the novel manner of association.

It is, of course, to be understood that the various parts may be somewhat changed in practice to accommodate any slight changes necessary in the adaptability of the device to various structures now on the market and, therefore, we do not desire to be limited in any respect except as set forth in the appended claim.

We claim:—

In weft cutting mechanism for looms, in combination, a temple and a roll support extending laterally from one side thereof, the said temple having its said side located close to and in spaced relation to the end of the roll support whereby to be in close proximity to the selvage of the cloth passing over rolls upon the support, the temple being provided in its said side with a recess and having upon its said side a shoulder located at one end of the recess, a fixed blade mounted in said recess and abutting at one end against said shoulder, the blade being formed in its said end with a V-shaped notch, the portion of the blade constituting the bottom wall of the notch being sharpened to provide a shearing edge, and the other wall of the notch being inclined upwardly above said edge, a shaft mounted in the temple, a movable blade upon the shaft and positioned within the recess beside the fixed blade, and means connected with the shaft for operation by the shuttle changing mechanism of the loom to effect rocking of the shaft and actuation of the movable blade to sever the weft.

In testimony whereof we affix our signatures.

HENRY C. BAUSINGER, Jr.
HOWARD D. BARNES.